United States Patent
Inagaki et al.

(10) Patent No.: US 11,663,519 B2
(45) Date of Patent: May 30, 2023

(54) ADJUSTING TRAINING DATA FOR A MACHINE LEARNING PROCESSOR

(71) Applicant: International Business Machines Corporation, Armonk, NY (US)

(72) Inventors: Takeshi Inagaki, Tokyo (JP); Aya Minami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 16/397,971

(22) Filed: Apr. 29, 2019

(65) Prior Publication Data
US 2020/0342354 A1    Oct. 29, 2020

(51) Int. Cl.
*G06N 20/00* (2019.01)
*G06N 3/08* (2023.01)
*G06F 40/279* (2020.01)
*G06F 40/284* (2020.01)
*G06F 40/56* (2020.01)
*G06N 3/044* (2023.01)

(52) U.S. Cl.
CPC ........... *G06N 20/00* (2019.01); *G06F 40/279* (2020.01); *G06F 40/284* (2020.01); *G06F 40/56* (2020.01); *G06N 3/044* (2023.01); *G06N 3/08* (2013.01)

(58) Field of Classification Search
CPC ........ G06N 20/00; G06N 20/10; G06N 20/20; G06F 3/02; G06F 3/04; G06F 3/0445; G06F 3/08; G06F 40/279; G06F 40/284; G06F 40/56; G06F 3/044
See application file for complete search history.

(56) References Cited

U.S. PATENT DOCUMENTS

| | | |
|---|---|---|
| 8,543,381 B2 * | 9/2013 | Connor ................. G06F 16/345 704/7 |
| 2013/0018649 A1 | 1/2013 | Deshmukh et al. |
| 2015/0254233 A1 | 9/2015 | Artzi et al. |
| 2015/0372963 A1 | 12/2015 | Root et al. |
| 2016/0078361 A1 * | 3/2016 | Brueckner .............. H04L 67/10 706/12 |
| 2016/0148115 A1 * | 5/2016 | Sirosh .................... G06N 20/00 706/11 |
| 2016/0239479 A1 * | 8/2016 | Rose Charvet ....... G06F 40/253 |
| 2017/0061330 A1 * | 3/2017 | Kurata ................ G06F 16/3344 |
| 2017/0132512 A1 * | 5/2017 | Ioffe .................... G06K 9/6256 |
| 2018/0025269 A1 * | 1/2018 | Dursun .................. E21B 44/00 175/24 |

(Continued)

OTHER PUBLICATIONS

All you need to know about text preprocessing for NLP and Machine Learning (Gavita, Kanesan) taken from https://www.freecodecamp.org/news/all-you-need-to-know-about-text-preprocessing-for-nlp-and-machine-learning-bc1c5765ff67/ (Year: 2019).*

(Continued)

*Primary Examiner* — Shane D Woolwine
(74) *Attorney, Agent, or Firm* — Zilka-Kotab, P.C.

(57) ABSTRACT

A computer-implemented method according to one embodiment includes receiving a single instance of training data, simplifying the single instance of training data to create a single instance of simplified training data, generating a plurality of training data variants, based on the single instance of simplified training data, and training a machine learning model, utilizing the plurality of training data variants.

25 Claims, 6 Drawing Sheets

(56) References Cited

U.S. PATENT DOCUMENTS

| | | | |
|---|---|---|---|
| 2018/0113856 A1 | 4/2018 | Anisimovich et al. | |
| 2018/0189265 A1* | 7/2018 | Chen | G06N 7/005 |
| 2019/0034416 A1 | 1/2019 | Al Hasan et al. | |
| 2019/0043486 A1* | 2/2019 | Salloum | G10L 15/26 |
| 2019/0108465 A1* | 4/2019 | Zhou | G06Q 10/06375 |

OTHER PUBLICATIONS

That's So Annoying!!!: A Lexical and Frame-Semantic Embedding Based Data Augmentation Approach to Automatic Categorization of Annoying Behaviors using #petpeeve Tweets taken from https://aclanthology.org/D15-1306/ (Year: 2015).*

Text Data Augmentation Made Simple By Leveraging NLP Cloud APIs taken from https://arxiv.org/abs/1812.04718 (Year: 2018).*

All you need to know about text preprocessing for NLP and Machine Learning taken from https://www.freecodecamp.org/news/all-you-need-to-know-about-text-preprocessing-for-nlp-and-machine-learning-bc1c5765ff67/ (Year: 2019).*

Text Preprocessing in Python: Steps, Tools, and Examples taken from https://medium.com/@datamonsters/text-preprocessing-in-python-steps-tools-and-examples-bf025f872908 (Year: 2018).*

EDA: Easy Data Augmentation Techniques for Boosting Performance on Text Classification Tasks taken from https://arxiv.org/abs/1901.11196v1 (Year: 2019).*

BERT: Pre-training of Deep Bidirectional Transformers for Language Understanding taken from https://arxiv.org/abs/1810.04805v1 (Year: 2018).*

Preprocessing Techniques for Text Mining—An Overview taken from https://www.researchgate.net/publication/339529230_Preprocessing_Techniques_for_Text_Mining_-_An_Overview (Year: 2015).*

Mueller et al., "Siamese Recurrent Architectures for Learning Sentence Similarity," Proceedings of the Thirtieth AAAI Conference on Artificial Intelligence, 2016, pp. 2786-2792.

OMG, "Business Process Model and Notation (BPMN)," Object Management Group, Version 2.0.2, Dec. 2013, 532 pages.

* cited by examiner

ADJUSTING TRAINING DATA FOR A MACHINE LEARNING PROCESSOR

BACKGROUND

The present invention relates to machine learning, and more specifically, this invention relates to training and utilizing neural networks.

Machine learning models (such as artificial neural networks) must be trained utilizing training data before they can be used. In many cases, models may be trained utilizing a small subset of training data. However, learning models that implement complicated functionality (such as natural language processing) require a significantly larger volume of training data in order to account for a variety of modifications, irregular usage, etc. in the natural language. It is therefore desirable to reduce an amount of necessary training data for these learning models, while still implementing adequate training of the models.

SUMMARY

A computer-implemented method according to one embodiment includes receiving a single instance of training data, simplifying the single instance of training data to create a single instance of simplified training data, generating a plurality of training data variants, based on the single instance of simplified training data, and training a machine learning model, utilizing the plurality of training data variants.

According to another embodiment, a computer program product for adjusting training data for a machine learning processor includes a computer readable storage medium having program instructions embodied therewith, where the computer readable storage medium is not a transitory signal per se, and where the program instructions are executable by a processor to cause the processor to perform a method including receiving, by the processor, a single instance of training data, simplifying, by the processor, the single instance of training data to create a single instance of simplified training data, generating, by the processor, a plurality of training data variants, based on the single instance of simplified training data, and training, by the processor, a machine learning model, utilizing the plurality of training data variants.

A system according to another embodiment includes a processor, and logic integrated with the processor, executable by the processor, or integrated with and executable by the processor, where the logic is configured to receive a single instance of training data, simplify the single instance of training data to create a single instance of simplified training data, generate a plurality of training data variants, based on the single instance of simplified training data, and train a machine learning model, utilizing the plurality of training data variants.

A computer-implemented method according to another embodiment includes receiving an instance of data, simplifying the instance of data to create an instance of simplified data, applying the instance of simplified data to a trained machine learning model; and receiving a label prediction for the instance of simplified data from the trained machine learning model.

A computer-implemented method according to another embodiment includes receiving a single instance of training data, simplifying the single instance of training data to create a single instance of simplified training data, generating a plurality of training data variants, based on the single instance of simplified training data, training a machine learning model, utilizing the plurality of training data variants, receiving an instance of input data, simplifying the instance of input data to create an instance of simplified input data, applying the instance of simplified input data into the trained machine learning model, and receiving a label prediction for the instance of simplified input data from the trained machine learning model.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for adjusting training data for a machine learning processor. Various embodiments provide a method to pre-process training data to account for irregularities in data to be classified/labeled.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting training data for a machine learning processor.

In one general embodiment, a computer-implemented method includes receiving a single instance of training data, simplifying the single instance of training data to create a single instance of simplified training data, generating a plurality of training data variants, based on the single instance of simplified training data, and training a machine learning model, utilizing the plurality of training data variants.

In another general embodiment, a computer program product for adjusting training data for a machine learning processor includes a computer readable storage medium having program instructions embodied therewith, where the computer readable storage medium is not a transitory signal per se, and where the program instructions are executable by a processor to cause the processor to perform a method including receiving, by the processor, a single instance of training data, simplifying, by the processor, the single instance of training data to create a single instance of simplified training data, generating, by the processor, a plurality of training data variants, based on the single instance of simplified training data, and training, by the processor, a machine learning model, utilizing the plurality of training data variants.

In another general embodiment, a system includes a processor, and logic integrated with the processor, executable by the processor, or integrated with and executable by the processor, where the logic is configured to receive a single instance of training data, simplify the single instance of training data to create a single instance of simplified training data, generate a plurality of training data variants, based on the single instance of simplified training data, and train a machine learning model, utilizing the plurality of training data variants.

In another general embodiment, a computer-implemented method includes receiving an instance of data, simplifying the instance of data to create an instance of simplified data, applying the instance of simplified data to a trained machine learning model; and receiving a label prediction for the instance of simplified data from the trained machine learning model.

In another general embodiment, a computer-implemented method includes receiving a single instance of training data, simplifying the single instance of training data to create a single instance of simplified training data, generating a plurality of training data variants, based on the single instance of simplified training data, training a machine learning model, utilizing the plurality of training data variants, receiving an instance of input data, simplifying the instance of input data to create an instance of simplified input data, applying the instance of simplified input data into the trained machine learning model, and receiving a label prediction for the instance of simplified input data from the trained machine learning model.

Figure 1:
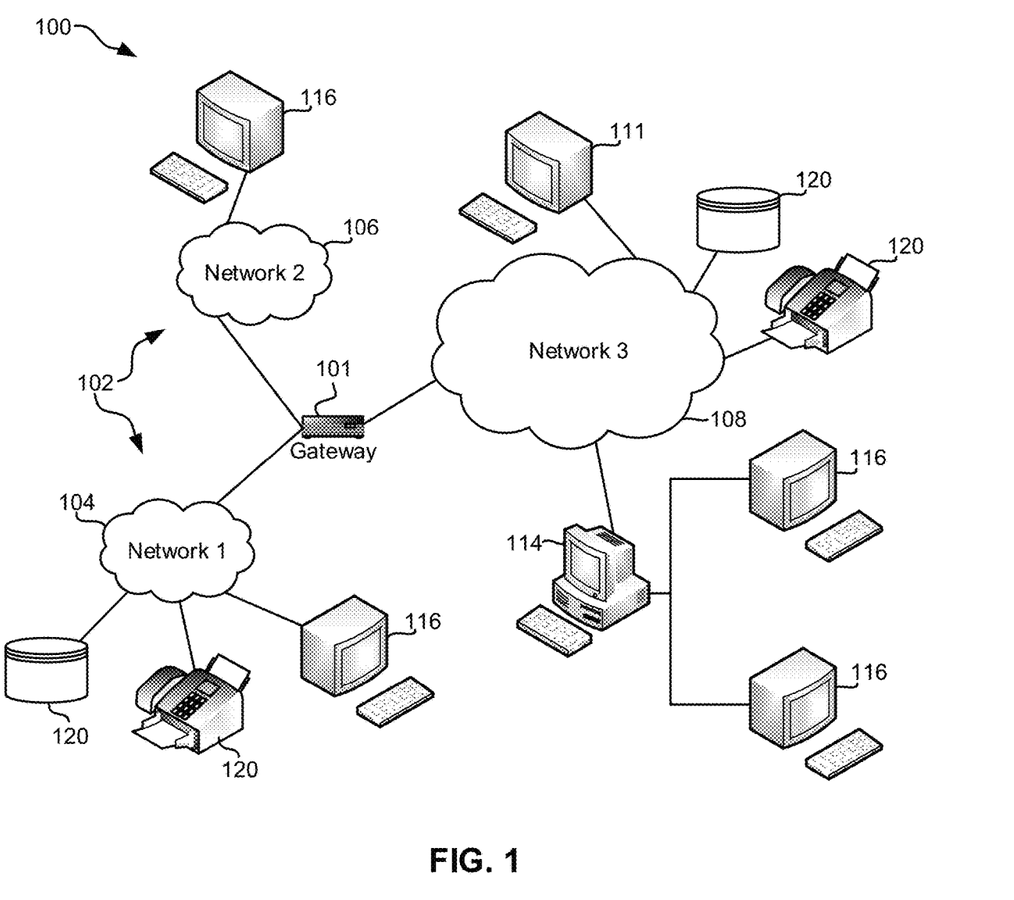
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
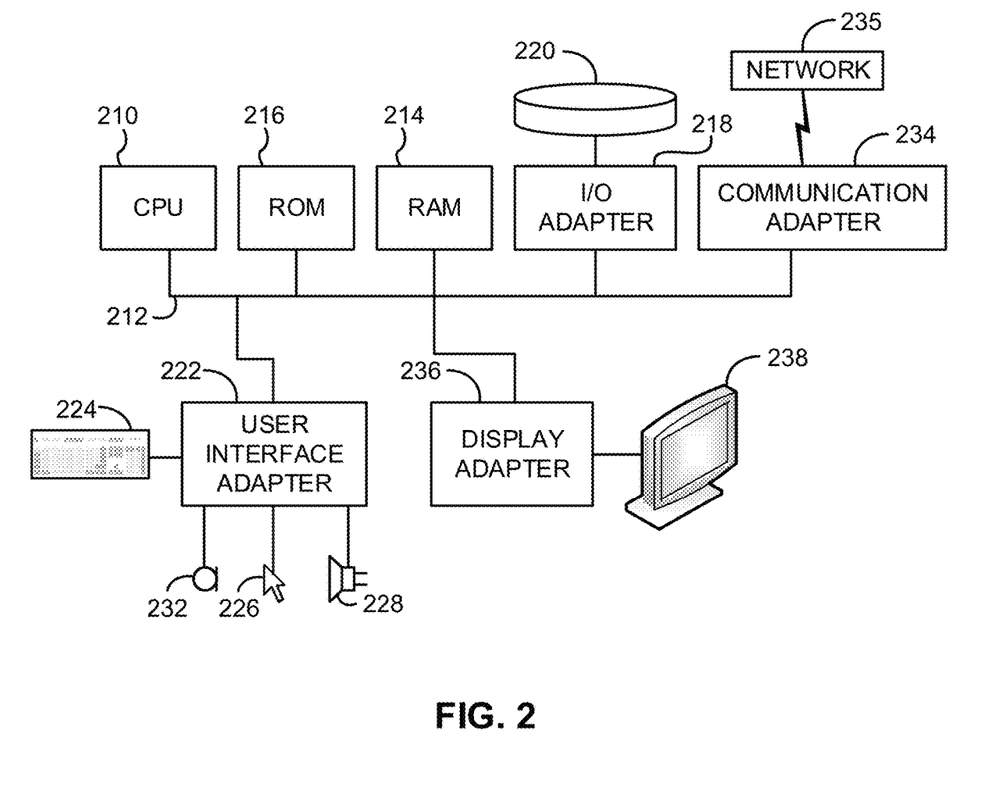
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
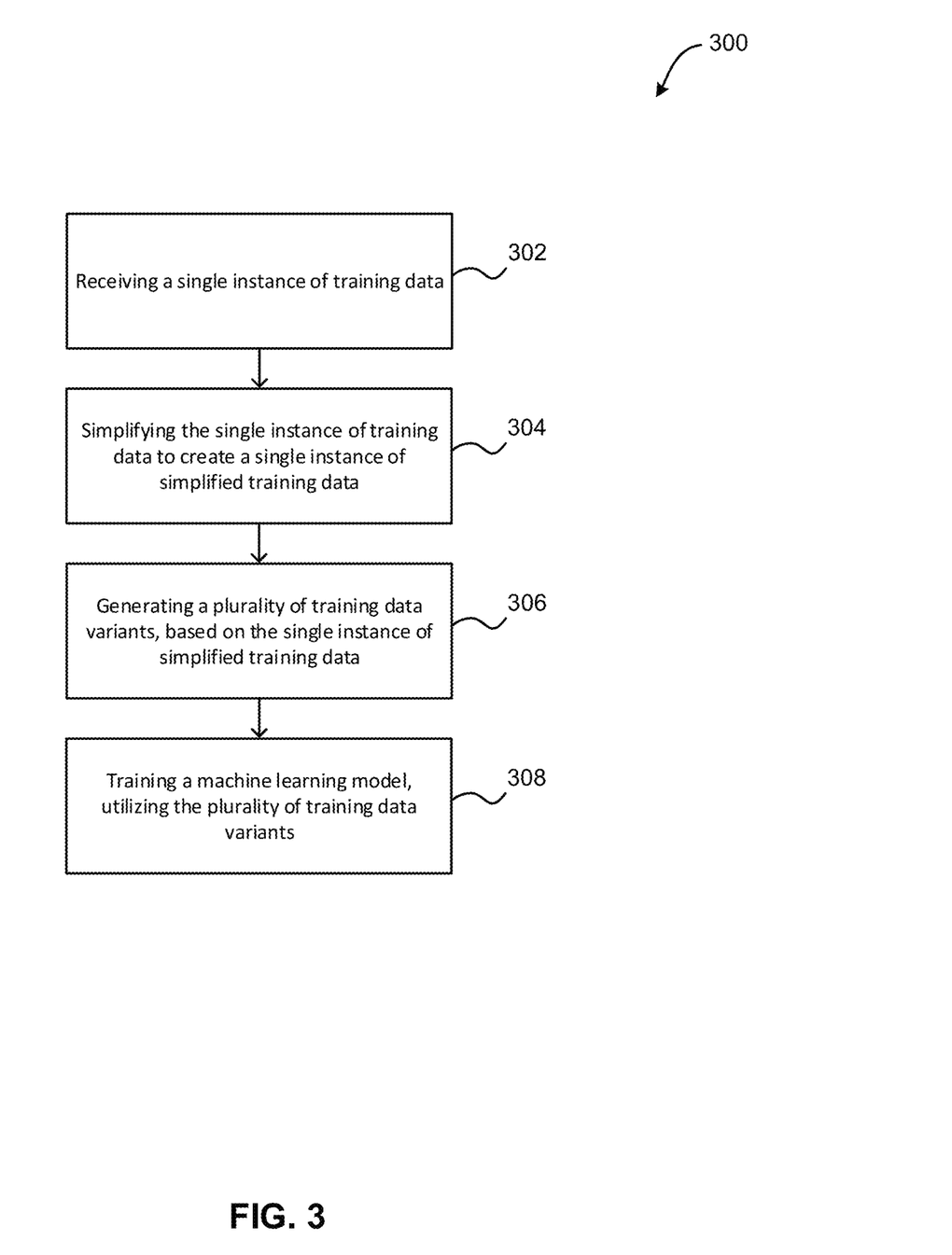
FIG. 3 illustrates a method for adjusting training data for a machine learning processor, in accordance with one embodiment.

Now referring to FIG. 3, a flowchart of a method 300 is shown according to one embodiment. The method 300 may be performed in accordance with the present invention in any of the environments depicted in FIGS. 1-2 and 5-6, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a single instance of training data is received. In one embodiment, the training data may include textual data. In another embodiment, the training data may include a string of text (e.g., a plurality of words, etc.). In yet another embodiment, the training data may include all or a portion of a natural language sentence.

Additionally, in one embodiment, the training data may include a plurality of words, phrases, and/or symbols. In another embodiment, the training data may be created by one or more individuals. In yet another embodiment, the training data may be retrieved from one or more sources (e.g., data repositories, etc.).

Further, in one embodiment, the training data may be received as a result of one or more parsing actions. In another embodiment, the training data may include an instance of data used to train a machine learning model. In yet another embodiment, the training data may have an associated label.

Further still, method 300 may proceed with operation 304, where the single instance of training data is simplified to create a single instance of simplified training data. In one embodiment, simplifying the single instance of training data may include replacing one or more terms within the single instance of training data with a word stem. For example, if the single instance of training data includes a verb in the past tense, the verb may be replaced with the verb in a present tense.

Also, in one embodiment, simplifying the single instance of training data may include replacing one or more terms within the single instance of training data with a genericized term. For example, if the single instance of training data includes a specific product name, the specific product name may be replaced with the generic term "PRODUCT NAME". In another embodiment, term replacement may be performed utilizing a dictionary. For example, the dictionary may include a plurality of generic terms, where each generic term is correlated to a plurality of specific terms (e.g., product names, specific examples, etc.).

In addition, in one embodiment, if the single instance of training data includes a specific date, the specific date may be replaced with the generic term "DATE". In another embodiment, term replacement may be performed utilizing one or more pattern rules.

Furthermore, in one embodiment, simplifying the single instance of training data may include discarding one or more terms within the single instance of training data. For example, predetermined types of words may be removed from the single instance of training data. In another example, the predetermined types of words may include articles, pronouns, etc. In yet another example, the predetermined types of words may include words appearing more than a predetermined number of times within the single instance of training data.

Further still, in one embodiment, simplifying the single instance of training data may include adjusting a length of the single instance of training data. For example, a length of the single instance of training data may be increased, reduced, etc. In another embodiment, the length of the single instance of training data may include a number of words within the single instance of training data. For example, a length of the single instance of training data may be increased by repeating one or more words (or sequences of words) found within the single instance of training data.

Also, in one embodiment, the length of the single instance of training data may be adjusted so that it matches (or is within a predetermined percentage of) a predetermined length (e.g., a predetermined number of words, a predetermined number of characters, etc.). In this way, fluctuations within training data may be removed in order to homogenize the training data to match a predetermined standard.

Additionally, method 300 may proceed with operation 306, where a plurality of training data variants are generated, based on the single instance of simplified training data. In one embodiment, generating the plurality of training data variants may include adjusting the single instance of training data in a plurality of different ways, where each adjustment results in one of the plurality of training data variants. In another embodiment, generating the plurality of training data variants may include changing an order of words within the single instance of simplified data to create a training data variant.

For example, a first adjustment may be made to an order of words within the single instance of simplified data to create a first training data variant, a second adjustment different from the first adjustment may be made to the order of words within the single instance of simplified data to create a second training data variant different from the first training data variant, etc.

Further, in one embodiment, an order of words may be changed in response to determining that a total number of words within the single instance of simplified training data is greater than a predetermined threshold. For example, an order of words may not be changed in response to determining that a total number of words within the single instance of simplified training data is less than the predetermined threshold. In another example, an order of predetermined words may not be changed (e.g., the word "not" preceding a verb or noun, etc.).

Further still, in one embodiment, generating the plurality of training data variants may include substituting a first word within the single instance of simplified training data with a second word determined to be similar to the first word. For example, the second word may be a synonym of the first word, and may be retrieved from a data source such as a dictionary.

Also, in one embodiment, a dictionary may also include a plurality of generic terms, where each generic term is correlated to a plurality of specific terms. In another embodiment, a term within the single instance of simplified training data may be compared to the dictionary to determine a substitute term to replace the term within the single instance of simplified training data. For example, if the term within the single instance of simplified training data is a generic term (resulting from the simplifying of the single instance of training data), the generic term may be replaced with a specific term that correlates to the generic term.

In addition, in one embodiment, the generic term may be replaced with a first specific term that correlates to the generic term to create a first training data variant, the generic term may be replaced with a second specific term that correlates to the generic term (and that is different from the first specific term) to create a second training data variant different from the first training data variant, etc.

Furthermore, method 300 may proceed with operation 308, where a machine learning model is trained, utilizing the plurality of training data variants. In one embodiment, the single instance of training data may have an associated label (e.g., a class label, etc.). For example, the label may indicate a meaning of the single instance of training data (e.g., a meaning of a sentence, a class to which the sentence belongs, etc.).

Further still, in one embodiment, each of the plurality of training variants may be given the same associated label as the single instance of training data. In another embodiment, each of the plurality of training variants (with their associated label) may be input into a machine learning model to train the machine learning model. In yet another embodiment, the machine learning model may include an artificial neural network (ANN) such as a recurrent neural network (RNN), a logistics regression (LR) network, etc.

Also, in one embodiment, the machine learning model may perform natural language processing. For example, the machine learning model may determine a label for input instances of data.

In this way, training data may be automatically preprocessed to account for irregularities (e.g., irregular word usage, etc.) in data to be classified/labeled. This may be done instead of manually creating individual training data instances with patterns corresponding to all irregularities in the data to be classified/labeled. This may reduce an amount of training data that is created, stored, and used to train the machine learning model, while still enabling the learning of complex patterns during training. As a result, an amount of storage space utilized by a computing device implementing such training may be reduced, and a performance of such computing device may be improved (as improved training maybe enabled with less training data).

Figure 4:
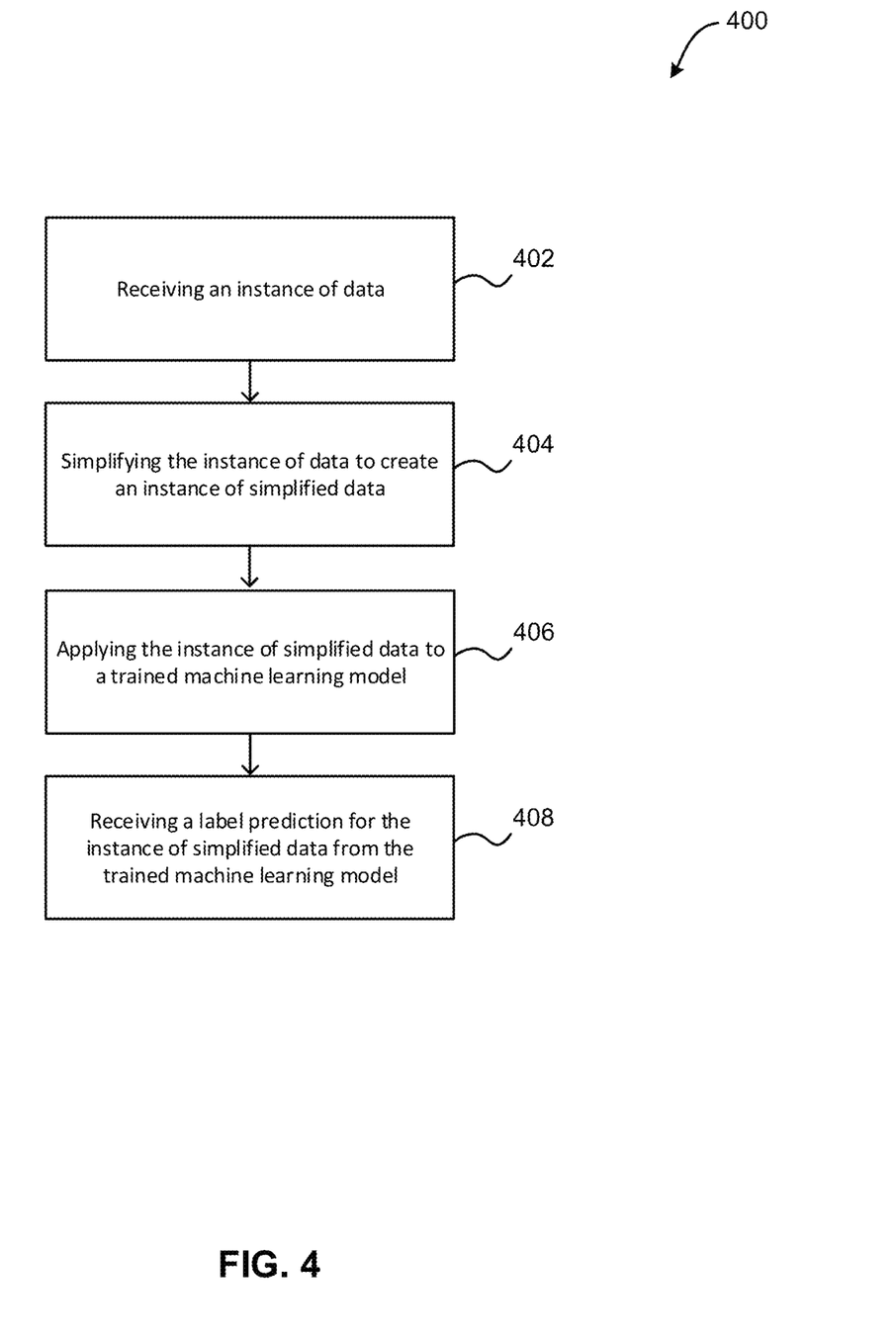
FIG. 4 illustrates a method for implementing a trained machine learning model, in accordance with one embodiment.

Now referring to FIG. 4, a flowchart of a method 400 for implementing a trained machine learning model is shown according to one embodiment. The method 400 may be performed in accordance with the present invention in any of the environments depicted in FIGS. 1-2 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an instance of data is received. In one embodiment, the instance of data may include an instance of data to be classified/labeled. In another embodiment, the instance of data may include textual data. In yet another embodiment, the instance of data may include a string of text (e.g., a plurality of words, etc.).

Additionally, in one embodiment, the instance of data may include all or a portion of a natural language sentence. In another embodiment, the instance of data may include a plurality of words, phrases, and/or symbols to be labeled via natural language processing.

Further, method 400 may proceed with operation 404, where the instance of data is simplified to create an instance of simplified data. In one embodiment, simplifying the instance of data may include replacing one or more terms within the instance of data with a word stem. In another embodiment, simplifying the instance of training data may include replacing one or more terms within the instance of data with a genericized term.

Further still, in one embodiment, simplifying the instance of data may include discarding one or more terms within the instance of data. In another embodiment, simplifying the instance of data may include adjusting a length of the instance of training data. In this way, the instance of data may homogenized to match a predetermined standard.

Also, method 400 may proceed with operation 406, where the instance of simplified data is applied to a trained machine learning model. In one embodiment, the trained machine learning model may include a trained neural network. In another embodiment, the trained machine learning model may be trained as shown above in FIG. 3. For example, the trained machine learning model may be trained utilizing a plurality of training data variants created from a single instance of simplified training data. In yet another embodiment, the trained machine learning model may perform natural language processing.

In addition, method 400 may proceed with operation 408, where a label prediction for the instance of simplified data is received from the trained machine learning model. In one embodiment, the label prediction may be received in response to applying the instance of simplified data to the trained machine learning model. In another embodiment, the trained machine learning model may output the label prediction in response to receiving the instance of simplified data as input.

In this way, the trained machine learning model may perform natural language processing by classifying/labelling data instances.

Controlling Machine Learning Model Characteristics by Diffusing Input Data

Machine learning involves learning an observed pattern. In a case where a simple law exists behind a phenomenon like a physical phenomenon, it is possible to learn a model with a small number of learning samples by designing the learning model according to the law. For example, a one-dimensional dynamic system like an orbit of a planet revolving around the sun can be identified by two variables—a position and a momentum at certain time. Therefore, it is possible to complete a model only by observing the two variables. It is because physical simplicity hides behind a phenomenon that machine learning is useful in both the recognition of an image and the recognition of a voice.

On the other hand, in a natural language, such an absolute law does not exist. Though grammar for each language specifies a possible order of words to some extent, irregular usage is allowed within a range that a person can understand a meaning of such usage. Therefore, grammar is not a law that is always established. For example, a word which is originally a noun may be used as a verb. Therefore, dependence on grammar rules based on part-of-speech information excessively limits patterns that can be added in a supplemental manner. Therefore, for natural language processing by analysis of "modification relationships" among words and phrases based on general grammar (for example, identification of a subject, etc.) which has been conventionally used, accuracy can be expected from the natural language processing to some extent, but dropping often occurs.

During natural language processing, a law of a class is applied to variations of the same class in order to identify a class label for the variations. Among expressions of a natural language, a plurality of expressions having equivalent meanings exist. An equivalence class (a class) of such expressions will be defined, and the expressions will be labeled. A unit being labeled is a document, a sentence or a word.

In order to understand the complicated manner of the subject, consideration will be made on a case where a sentence is created using M words among N words when arbitrary arrangements are allowed. The number of all possible arrangements is shown below:

In the case of N=1000 and M=10:
With order: $N^M=10^{30}$ patterns
Without order: $N!/(N-M)!M!=1000\times \ldots \times 991/10\times \ldots \times 1=2.6\times 10^{23}$ pattern When smaller values are taken as N and M, for example, N=20 and M=3 are taken, the following is obtained:

In the case of N=20 and M=3:
With order: $N^M=8000$ patterns
Without order: $N!/(N-M)!M!=20\times 19\times 18/3\times 2\times 1=1140$ patterns That is, when natural language processing is attempted using machine learning, training data of this order of magnitude is required.

On the other hand, it is said that the number of pieces of data that can be prepared as training data for utilization in a company is about 10 to 1000. That is, it is extremely difficult to prepare all of various sentence patterns and cause the patterns to be learned.

For this reason, a method that has been conventionally often used in the natural language processing is a method in which a logical classification logic is defined by a human being without depending on machine learning. This method is also called natural language processing by rules. In this approach, however, it is necessary that the human being recognizes the whole image of patterns, and application of the approach is limited.

The situation is summarized as below:
It is impossible to prepare all patterns as teacher data.
It is also impossible for a human being to grasp all the patterns to construct rules In one embodiment, this difficulty is solved by the method below:

1. For given teacher data, "allowable fluctuation" is explicitly specified, and machine learning is performed in a form including the "fluctuation".

2. The following two methods are used together in order to include the "fluctuation":

Type 1 processing: As preprocessing for machine learning, unnecessary information (fluctuation) is excluded from a sentence written in a natural language using a dictionary and pattern rules.

Type 2 processing: Rewriting of a sentence is performed within a range of the same meaning to generate a plurality of pieces of teacher data from one piece of teacher data.

In one embodiment, a method for the Type 1 processing includes:

Normalization of replacing a written expression with a word stem
Example: Tenses of "went" and "gone" are replaced with present tense "go".

Replacement of written expressions with a generic written expression by the dictionary
Example: Specific product names are replaced with "Product Name".

Replacement of character string patterns with a generic written expression
Example: The written expression of "Dec. 31, 1999" is replaced with "Date".

Excluding of words thought to be unimportant from part-of-speech information and the dictionary
Example: articles, pronouns and frequently appearing words Adjustment of lengths of sentences
The same words and word arrangements are repeatedly written so that lengths of sentences after conversions are the same. This is a processing for excluding information about lengths of sentences because a result is influenced by the lengths of sentences in some learning algorithms.

One exemplary object of the Type 1 processing is to exclude information that is unnecessary for a subject from a target document. This processing is applied to both of teacher data at the time of learning and target data at the time of using a learned model.

In another embodiment, a method for the Type 2 processing includes:

Exchange of order of words within a specified range
Among a specified or smaller number of words, exchange of the order of words is not performed. For example, the order of two words is maintained.
Only exchange between nearby sets of the specified number of words is permitted.

Exchange with another word based on the dictionary
If a written expression of "purchase" exists, a written expression of "buy" is generated. The word "buy" is not only used to refer to purchasing of goods but also used in the written expression of "buy someone's opinion". In such a case, if "buy" is registered with the dictionary by the type 1 processing, the two meanings cannot be differentiated from each other. To grasp such a branching pattern of a meaning, machine learning is suitable. Therefore, learning data is explicitly developed. In one example, between "purchase beer" and "buy an opinion", meanings can be separated based on a relationship of each phrase with a word used together.

In one embodiment, development of a sample sentence according to rules can be written, for example, by a rule system as shown below in Table 1:

TABLE 1

Entity Extraction Rule

POS - entity is referred as POS pattern
GDIC - surrounding words in general dictionary are expended with synonyms in training data
SDIC - surrounding words in special dictionary or char rules are replaced with dictionary name symbol
LIT - surrounding words not in dictionaries are referred to literally
Weak references - surrounding words far from entries are ordered in random, except for predetermined patterns (e.g., "not + verb, noun sequences, etc.)
Sentence Labeling Rule GDIC - all words in general dictionary are expanded with synonyms in training data
SDIC - all words in special dictionary or char rules are replaced with dictionary name symbol
LIT - all words not in dictionaries are referred to literally
Weak references - all words far from entries are ordered in random, except for predetermined patterns (e.g., "not + verb, noun sequences, etc.)

An object of the Type 2 processing is to increase teacher data and is applied only to teacher data at the time of learning.

Figure 5:
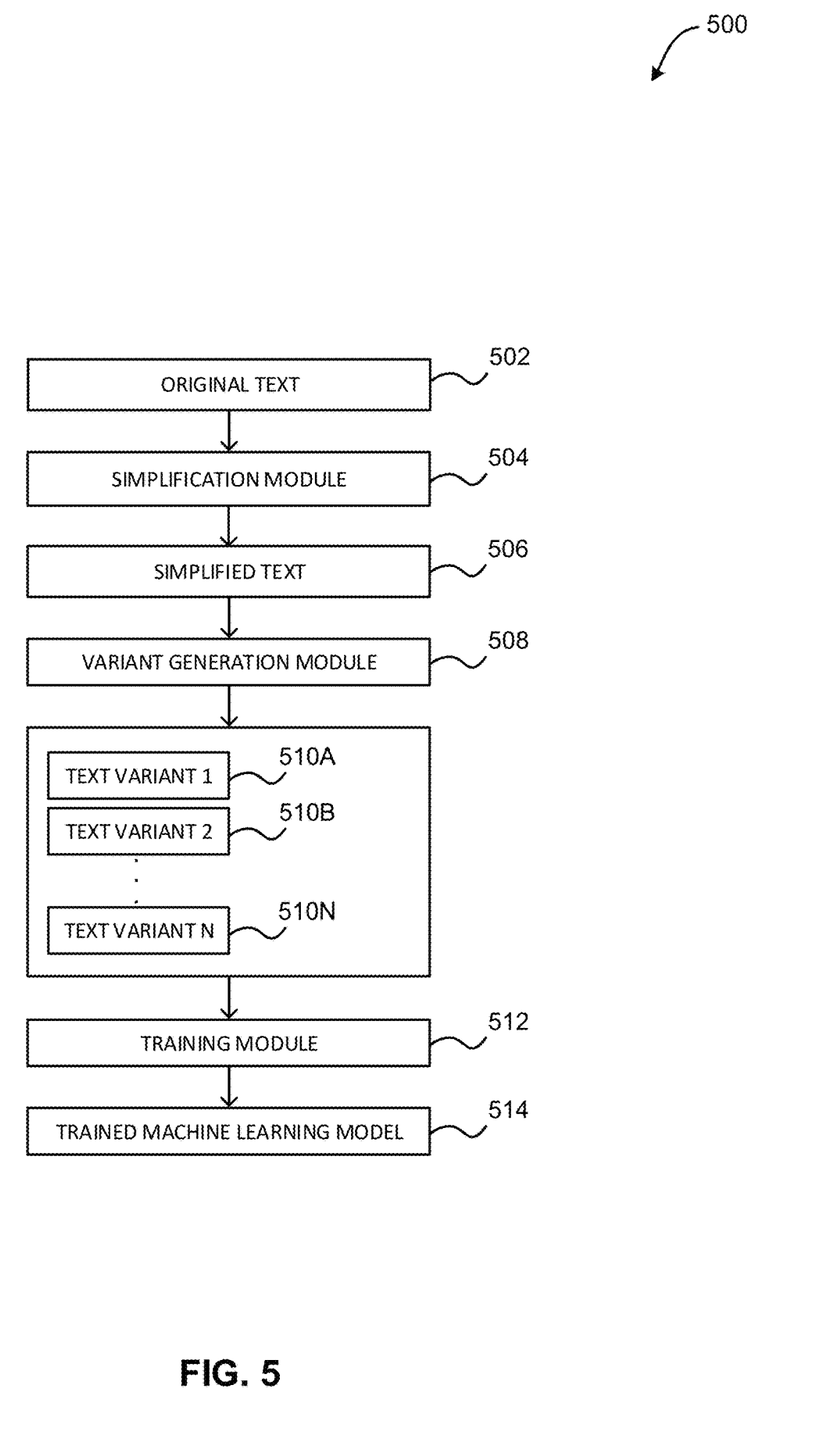
FIG. 5 illustrates an exemplary environment for diffusing input data to train a machine learning model, in accordance with one embodiment.

FIG. 5 illustrates an exemplary environment 500 for diffusing input data to train a machine learning model, according to one exemplary embodiment. As shown, an instance of original text 502 is input into a simplification module 504 that performs one or more simplification actions on the original text 502 (e.g., Type 1 processing shown above, etc.). This results in an instance of simplified text 506, which is then input into a variant generation module 508 that generates a plurality of text variants 510A-N (e.g., by using Type 2 processing, etc.).

Additionally, the plurality of text variants 510A-N are used by a training module 512 to create a trained machine learning model 514.

Figure 6:
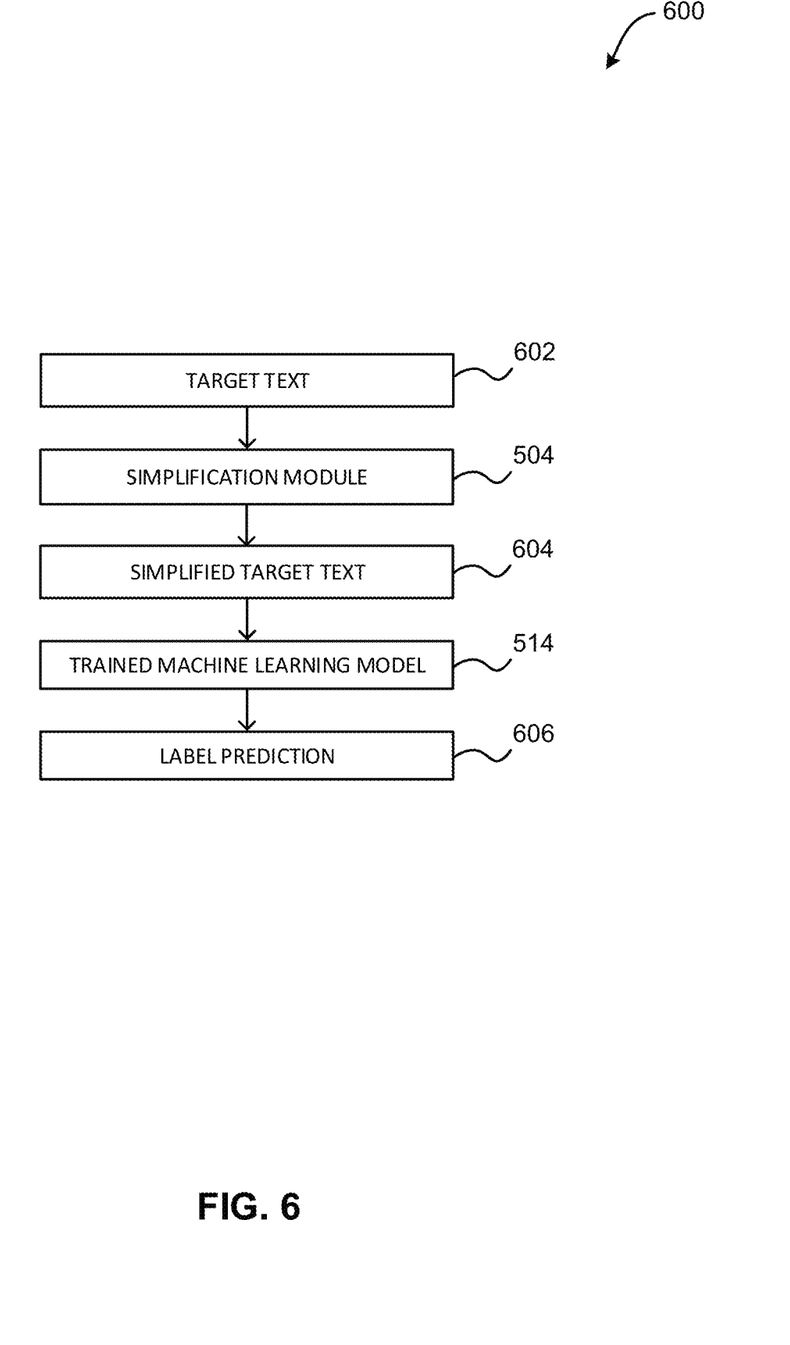
FIG. 6 illustrates an exemplary implementation of the trained machine learning model from FIG. 5, in accordance with one embodiment.

Additionally, FIG. 6 illustrates an exemplary implementation of the trained machine learning model from FIG. 5, as shown in one embodiment. As shown in FIG. 6, an instance of target text 602 is input into the simplification module 504 that performs one or more simplification actions on the target text 602 (e.g., Type 1 processing shown above, etc.), in a similar manner as the original text 502 from FIG. 5. This results in an instance of simplified target text 604, which is then input into the trained machine learning model 514 from FIG. 5, which outputs a label prediction for the simplified target text 606.

This implementation does not depend on a particular machine learning algorithm and can be used for general purposes. Further, since it is possible to cause the nature of learning to change only by preprocessing of data, using one general-purpose learning algorithm, the method is extremely versatile. For example, learning granularity can be changed for each target. In one embodiment, the Type 2 processing of creating variations on the learning data side is used together with the Type 1 processing. As a result, machine learning may be enhanced in order to determine unknown patterns, and allowable written expression fluctuation may be specified by a user.

To apply machine learning technologies efficiently, machine learning models need to be fit properly to problems to be solved. Generic characteristics of machine learning regardless of details of algorithms can be stated as follows:

1) a capability of learning complex patterns depends on a complexity of a model. More specifically, it depends on a number of internal parameters that are adjustable. 2) An amount of training data required to train a model (e.g., to fix internal parameters to fit a problem) depends on the complexity of the model.

A complex model can capture complex patterns. But training data should cover all patterns to be recognized.

Preparation of training data is a large cost factor in the use of machine learning technology. In practical use cases, a reduction of necessary training data is a primary goal. However, the capability of learning complex patterns is also needed to handle patterns in target data.

The complexity of a required model varies case by case depending on characteristics of target data. However, if one algorithm and model design are applied, it is hard to modify that configuration dynamically.

In one embodiment, a way to control a machine learning model's learning characteristics is provided. The characteristics may include a resolution of pattern recognition, which is one aspect of complexity of a model. For example, a recurrent neural network (RNN) algorithm applied to a text sentence learns an order of words in a sentence. On the other hand, logistics regression (LR) applied to classify a text sentence does not recognize an order of words. Apparently, the LR model is less complex than the RNN. To train the RNN properly, enough training data needs to be supplied to cover all possible ordering of words to be detected. For LR, bag of words needs to be labeled, and there is no need to cover all ordering patterns. Therefore, an RNN model may be changed to behave as a LR model by modifying input data.

To control learning characteristics of a model, a model is created with enough complexity to learn complex patterns such as ordering of words and conditional branch of logics in order to label them. We use an RNN with LSTM and attention for this purpose. This model makes distinction among sentences which are composed by the same set of words but are ordered in different way. To train this model to label sentences, we need to prepare labeled data for all patterns of all permutation of words. If the same label should be assigned to all sentences with the same set of words, we can omit the creation of all labeled data by hand-writing but we can generate that training data from one sample sentence by permutating the words by a program. If we need to be aware of a certain phrase which is sensitive to the ordering of words, we can omit these patterns from the machine generated training data. In this way, we can change the learning characteristic of a model without modifying model structure itself but just by modifying the input data only.

In one embodiment, a method of labeling text written in a natural language includes generating a plurality of training texts, including reducing the notation of the given text to a string pattern using a prescribed rule, and changing a character string pattern from one of the character string patterns to generate a plurality of training texts having the same meaning, and labeling input text, including reducing the notation of the input text to a character string pattern using the prescribed rule, and labeling the character string pattern using the training text.

In another embodiment, the character string pattern is changed by changing the order of the character string or replacing the character string.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a single instance of training data;
replacing one or more terms within the single instance of training data with a word stem to create a single instance of simplified training data;
replacing a specific term within the single instance of training data with a generic term to modify the single instance of simplified training data;
generating a plurality of training data variants, based on the single instance of simplified training data, wherein each of the plurality of training data variants includes a respective string of text, wherein generating the training data variants includes replacing the generic term within the single instance of simplified training data with a specific term retrieved from a dictionary that includes a plurality of generic terms correlated to specific terms thereby generating at least some training data variants having different specific terms relative to one another; and
training a machine learning model, utilizing the plurality of training data variants.

2. The computer-implemented method of claim 1, comprising:
replacing one or more terms within the single instance of training data with a genericized term, and
discarding one or more terms within the single instance of training data.

3. The computer-implemented method of claim 1, wherein the single instance of training data has an associated label.

4. The computer-implemented method of claim 1, comprising:
replacing a specific date within the single instance of training data with a generic date to modify the single instance of simplified training data,
wherein generating the plurality of training data variants includes:
replacing the generic term within the single instance of simplified training data with a first specific term that correlates to the generic term to create a first training data variant, and
replacing the generic term within the single instance of simplified training data with a second specific term different from the first specific term that correlates to the generic term to create a second training data variant different from the first training data variant,
wherein the first specific term and the second specific term are retrieved from the dictionary.

5. The computer-implemented method of claim 1, wherein:
in response to determining that the single instance of training data includes a specific product name, the specific product name is replaced with a generic product name term, and
in response to determining that the single instance of training data includes a specific date, the specific date is replaced with a generic date term.

6. The computer-implemented method of claim 1, comprising discarding one or more terms that appear more than a predetermined number of times within the single instance of training data.

7. The computer-implemented method of claim 1, comprising increasing a length of the single instance of training data by repeating one or more words within the single instance of training data so that the length of the single instance of training data matches a predetermined length.

8. The computer-implemented method of claim 1, wherein generating the plurality of training data variants includes:
changing an order of words within the single instance of simplified training data in response to determining that a total number of words within the single instance of simplified training data is less than a predetermined threshold, and
substituting a first word within the single instance of simplified training data with a second word determined to be similar to the first word.

9. The computer-implemented method of claim 1, wherein generating the plurality of training data variants includes changing an order of words within the single instance of simplified training data to create one of the plurality of training data variants.

10. The computer-implemented method of claim 1, wherein generating the plurality of training data variants includes:
　　replacing a generic term within the single instance of simplified training data with a first specific term that correlates to the generic term to create a first training data variant, and
　　replacing the generic term within the single instance of simplified training data with a second specific term different from the first specific term, wherein the second specific term correlates to the generic term to create a second training data variant different from the first training data variant.

11. The computer-implemented method of claim 1, wherein each of the plurality of training data variants are given a same associated label as the single instance of training data.

12. The computer-implemented method of claim 1, wherein each of the plurality of training data variants are input into the machine learning model to train the machine learning model.

13. The computer-implemented method of claim 1, wherein the machine learning model is an artificial neural network (ANN).

14. The computer-implemented method of claim 1, comprising:
　　adjusting a first length of the single instance of training data, including repeating one or more words within the single instance of training data; wherein:
　　generating the plurality of training data variants includes:
　　changing an order of words within the single instance of simplified training data in response to determining that a total number of words within the single instance of simplified training data is less than a predetermined threshold,
　　replacing a generic term within the single instance of simplified training data with a first specific term that correlates to the generic term to create a first training data variant, and
　　replacing the generic term within the single instance of simplified training data with a second specific term different from the first specific term, wherein the second specific term correlates to the generic term to create a second training data variant different from the first training data variant.

15. A computer program product comprising one or more computer readable storage media, and program instructions collectively stored on the one or more computer readable storage media, the program instructions comprising instructions configured to cause one or more processors to perform a method comprising:
　　receiving, by the one or more processors, a single instance of training data;
　　replacing, by the one or more processors, one or more terms within the single instance of training data with a word stem to create a single instance of simplified training data;
　　replacing, by the one or more processors, a specific term within the single instance of training data with a generic term to modify the single instance of simplified training data;
　　generating, by the one or more processors, a plurality of training data variants, based on the single instance of simplified training data, wherein each of the plurality of training data variants includes a respective string of text, wherein generating the training data variants includes replacing the generic term within the single instance of simplified training data with a specific term retrieved from a dictionary that includes a plurality of generic terms correlated to specific terms thereby generating at least some training data variants having different specific terms relative to one another; and
　　training, by the one or more processors, a machine learning model, utilizing the plurality of training data variants.

16. The computer program product of claim 15, comprising:
　　replacing, by the one or more processors, one or more terms within the single instance of training data with a genericized term, and
　　discarding, by the one or more processors, one or more terms within the single instance of training data.

17. The computer program product of claim 15, wherein the single instance of training data has an associated label.

18. The computer program product of claim 15, comprising:
　　replacing a specific date within the single instance of training data with a generic date to create the single instance of simplified training data,
　　wherein generating the plurality of training data variants includes:
　　replacing the generic term within the single instance of simplified training data with a first specific term that correlates to the generic term to create a first training data variant, and
　　replacing the generic term within the single instance of simplified training data with a second specific term different from the first specific term that correlates to the generic term to create a second training data variant different from the first training data variant,
　　wherein the first specific term and the second specific term are retrieved from a dictionary that includes a plurality of generic terms, wherein each generic term is correlated to a plurality of specific terms.

19. The computer program product of claim 15, comprising replacing, by the one or more processors, one or more terms within the single instance of training data with a genericized term.

20. The computer program product of claim 15, comprising discarding, by the one or more processors, one or more terms within the single instance of training data.

21. The computer program product of claim 15, wherein generating the plurality of training data variants includes adjusting, by the one or more processors, the single instance of training data in a plurality of different ways, wherein each adjustment results in one of the plurality of training data variants.

22. The computer program product of claim 15, wherein generating the plurality of training data variants includes changing, by the one or more processors, an order of words within the single instance of simplified training data to create one of the plurality of training data variants.

23. A system, comprising:
　　a processor; and
　　logic integrated with the processor, executable by the processor, or integrated with and executable by the processor, the logic being configured to:
　　receive a single instance of training data;
　　replace one or more terms within the single instance of training data with a word stem to create a single instance of simplified training data;
　　replace a specific term within the single instance of training data with a generic term to modify the single instance of simplified training data;

generate a plurality of training data variants, based on the single instance of simplified training data, wherein each of the plurality of training data variants includes a respective string of text, wherein generating the training data variants includes replacing the generic term within the single instance of simplified training data with a specific term retrieved from a dictionary that includes a plurality of generic terms correlated to specific terms thereby generating at least some training data variants having different specific terms relative to one another; and train a machine learning model, utilizing the plurality of training data variants.

24. A computer-implemented method, comprising:

receiving a single instance of training data;

simplifying the single instance of training data to create a single instance of simplified training data, wherein the single instance of training data includes a first string of text and the single instance of simplified training data includes a second string of text, the simplifying including:

adjusting a first length of the single instance of training data, including repeating one or more words within the single instance of training data, such that the single instance of simplified training data has a second length within a predetermined percentage of a predetermined length, replacing one or more terms within the single instance of training data with a word stem, in response to determining that the single instance of training data includes a specific product name, replacing the specific product name with a generic product name term, and in response to determining that the single instance of training data includes a specific date, replacing the specific date with a generic date term;

generating a plurality of training data variants, based on the single instance of simplified training data, wherein each of the plurality of training data variants includes a respective string of text, the generating including:

in response to determining that a total number of words within the single instance of simplified training data is greater than a predetermined threshold:

making a first adjustment to an order of words within the single instance of simplified training data to create a first training data variant, and making a second adjustment different from the first adjustment to the order of words within the single instance of simplified training data to create a second training data variant different from the first training data variant, wherein an order of predetermined words is not changed, replacing a generic term within the single instance of simplified training data with a first specific term retrieved from a dictionary, wherein the first specific term correlates to the generic term to create a third training data variant, and the dictionary includes a plurality of generic terms, wherein each generic term in the dictionary is correlated to a plurality of specific terms, and replacing the generic term within the single instance of simplified training data with a second specific term retrieved from a dictionary, wherein the second specific term is different from the first specific term, wherein the second specific term correlates to the generic term to create a fourth training data variant different from the first training data variant; and training a machine learning model, utilizing the plurality of training data variants.

25. A computer-implemented method, comprising:

receiving a single instance of training data;

replacing one or more terms within the single instance of training data with a word stem to create a single instance of simplified training data;

generating a plurality of training data variants, based on the single instance of simplified training data, wherein each of the plurality of training data variants includes a respective string of text, wherein generating the plurality of training data variants includes:

replacing a generic term within the single instance of simplified training data with a first specific term retrieved from a dictionary, wherein the first specific term correlates to the generic term to create a first of the training data variants, and the dictionary includes a plurality of generic terms, wherein each generic term in the dictionary is correlated to a plurality of specific terms, and replacing the generic term within the single instance of simplified training data with a second specific term retrieved from the dictionary, wherein the second specific term is different from the first specific term, wherein the second specific term correlates to the generic term to create a second of the training data variants different from the first training data variant;

training a machine learning model, utilizing the plurality of training data variants;

receiving an instance of input data;

simplifying the instance of input data to create an instance of simplified input data, wherein the instance of input data includes a third string of text and the instance of simplified input data includes a fourth string of text;

applying the instance of simplified input data into the trained machine learning model; and receiving a label prediction for the instance of simplified input data from the trained machine learning model.

* * * * *